United States Patent
Watari et al.

(10) Patent No.: US 6,663,828 B2
(45) Date of Patent: Dec. 16, 2003

(54) SINTERING METHOD AND APPARATUS USING CENTRIFUGAL FORCE

(75) Inventors: Koji Watari, Sunheights Chuoudai-F-306 5-1, Shiroyama 1-chome, Komaki-shi, Aichi-ken (JP); Mamoru Aizawa, Chitose (JP); Syoji Uchimura, Nagoya (JP); Hirohide Ishiguro, Gamagori (JP); Hideki Morimitsu, Shinshiro (JP)

(73) Assignees: National Institute of Advanced Industrial Science and Technology, Tokyo (JP); Koji Watari, Aichi-ken (JP); Sinto V-Cerax, Ltd., Aichi-ken (JP)

( * ) Notice: Subject to any disclaimer, the term of this patent is extended or adjusted under 35 U.S.C. 154(b) by 15 days.

(21) Appl. No.: 10/024,264

(22) Filed: Dec. 21, 2001

(65) Prior Publication Data

US 2002/0110475 A1 Aug. 15, 2002

(30) Foreign Application Priority Data

Dec. 26, 2000 (JP) ........................................ 2000-394268

(51) Int. Cl.[7] .................................................. B22F 3/12
(52) U.S. Cl. .............................. 419/36; 419/37; 419/38; 264/621; 264/669; 264/676; 425/78
(58) Field of Search .............................. 419/38, 36, 37; 264/621, 669, 676; 425/78

(56) References Cited

U.S. PATENT DOCUMENTS 5,336,465 A * 8/1994 Matsunaga et al. ............ 419/2

\* cited by examiner

*Primary Examiner*—Daniel J. Jenkins
(74) *Attorney, Agent, or Firm*—Finnegan, Henderson, Farabow, Garrett & Dunner LLP

(57) ABSTRACT

A method and an apparatus for sintering a compact of particulate material for a ceramic or of particles of a metal, or a ceramic precursor film, wherein the sintering is performed by heating and burning the compact or the ceramic precursor film while applying centrifugal force to the compact or the ceramic precursor film.

12 Claims, 1 Drawing Sheet

SINTERING METHOD AND APPARATUS USING CENTRIFUGAL FORCE

FIELD OF THE INVENTION

This invention relates to a method and an apparatus for sintering by which a sintered ceramic compact or a ceramic film having a compact structure (i.e., dense structure) can be produced.

DESCRIPTION OF THE PRIOR ART

Conventionally, a compact of particulate material for a ceramic, a compact of particles of metal, or a ceramic precursor film, is sintered by heating it at a high temperature in any one of various ambient gases (arbitrary ambient gases), wherein no additional pressure is applied to it. Further, to make the material dense and to enhance its mechanical, electrical, magnetic, and optical properties, a sintering technique has been developed wherein a mechanical force or a force via gas media is applied to the material to produce a sintered product made of fine crystal particles. For example, the hot pressing method and the sinter forging method are known. They each sinter a material while applying an axial mechanical force to it. In these methods a pressure is applied by a push rod to the material in its axial direction while it is being sintered.

However, in these methods the surface of the material that has contacted the push rod or die is contaminated. Thus, they require polishing or cutting off the surface of the material after it is sintered. Thus a high cost is necessitated to carry out the process.

The hot isostatic pressing (HIP) process is known as a method wherein a force is applied to a material via a gas media. Further, there are two methods in this process, namely, 1) the capsule HIP method, wherein a compact of the material is sealed in an evacuated capsule and then heated in a high-pressure gas under the HIP and 2) the capsule-free HIP method, wherein a material that has a density equal to or greater than 90% of the theoretical density is heated in a high-pressure gas.

The capsule HIP method has an advantage when producing a dense sintered product at a low temperature and a sintered product that has fine particles, due to the effect of the high-pressure gas. However, it has a problem in that it requires additional costs and time to put the material into the capsule and later remove it from the material. Further, although the capsule HIP method has another advantage, i.e., to make a large amount of material dense at once, it has a problem in that it must make the density of the material equal to or greater than 90% of the theoretical density by using an additional process, i.e., it requires a two-stage sintering process.

On the methods for producing a thin film, they are roughly classified into two methods, namely, the liquid phase method and the gas phase method, typically depending on the initial material. The representative liquid phase method is the sol-gel method. In this method an alkoxide liquid, etc., are mixed to be a predetermined composition, the resultant mixed solution is applied to a monocrystalline substrate such as Si, $SrTiO_3$, etc., to coat it, and the coated monocrystalline substrate is heated in an electric furnace to form a ceramic film. The liquid phase method such as this sol-gel method, etc., has an advantage in that it can precisely control the chemical composition of a precursor film material at a stage before it is heated. However, since the liquid phase method requires a heating process at high temperatures to make the ceramic film dense, there has been a problem of occasionally causing a change in the chemical composition of the ceramic film due to the chemical species evaporation in the precursor film. Thus the development of a sintering method that can make a film such as a precursor film, etc., dense at lower temperatures has been desired.

Further, in addition to that problem, it has been reported that it causes defects of cracks, etc., in the film when heating it, depending on the composition of the material of the produced film and on the kind of substrate (the kind of material and the roughness of the surface of the substrate). These defects, which are caused in the film during heating, are considered to be caused by the great stresses caused in the surface (X-Y plane) of the substrate by the shrinkage of the volume of the material during heating. Therefore, the present research has tried to produce a dense (compact) film by controlling the rate of heating, etc. Although in this case the above-mentioned hot pressing method and HIP method can be applied to make the film dense, it cannot always be a suitable process to make a film dense since it involves some problems such as a pretreatment and removal of a surface phase of a material.

Accordingly, the development of a sintering method and apparatus that can easily produce, without having said problems, a sintered ceramic compact and a ceramic film, each of which have a compact (dense) structure, has been desired.

SUMMARY OF THE INVENTION

The inventors of this application have considered said problems and have recognized that it is an important object to develop a sintering method that can apply stresses to a material in a predetermined direction without touching it when sintering a compact of particulate material for a ceramic or of metal particles or a ceramic precursor film After a difficult review and research, the inventors have found that a dense sintered compact of a ceramic, a dense sintered metal compact, or a dense ceramic film, can be produced by heating and baking a work while applying a centrifugal force to it by rotating it at a high speed, and thus they have conceived the present invention.

The present invention, which has been conceived to resolve said problems, is a method for sintering a compact made of material of particles of ceramic or metal, or a ceramic precursor film by heating and baking it while applying a centrifugal force to it. The present invention also includes an apparatus for sintering, comprising a furnace; a work-holding portion rotatably mounted in the furnace for holding material to be sintered; and rotating means connected to the work-holding portion for rotating it so as to apply centrifugal force to the material held by it.

Accordingly, a centrifugal force is generated when the work is rotate data high speed in the heating device. This centrifugal force is applied to a material that is attached to the work-holding portion while heating and baking the material. Thus stresses are applied to the material held by the work-holding portion, thereby having the particles be at the most appropriate degree of compaction, while its sintering proceeds. Further, the apparatus of this invention may include a vacuum and magnetic shielding bearing that rotatably receives the work-holding portion. The use of the vacuum and magnetic shielding bearing allows a material to be sintered in any one of various ambient gases, such as in a vacuum or an arbitrary, pressurized ambient gas.

DESCRIPTION OF THE PREFERRED EMBODIMENTS

Figure 1:
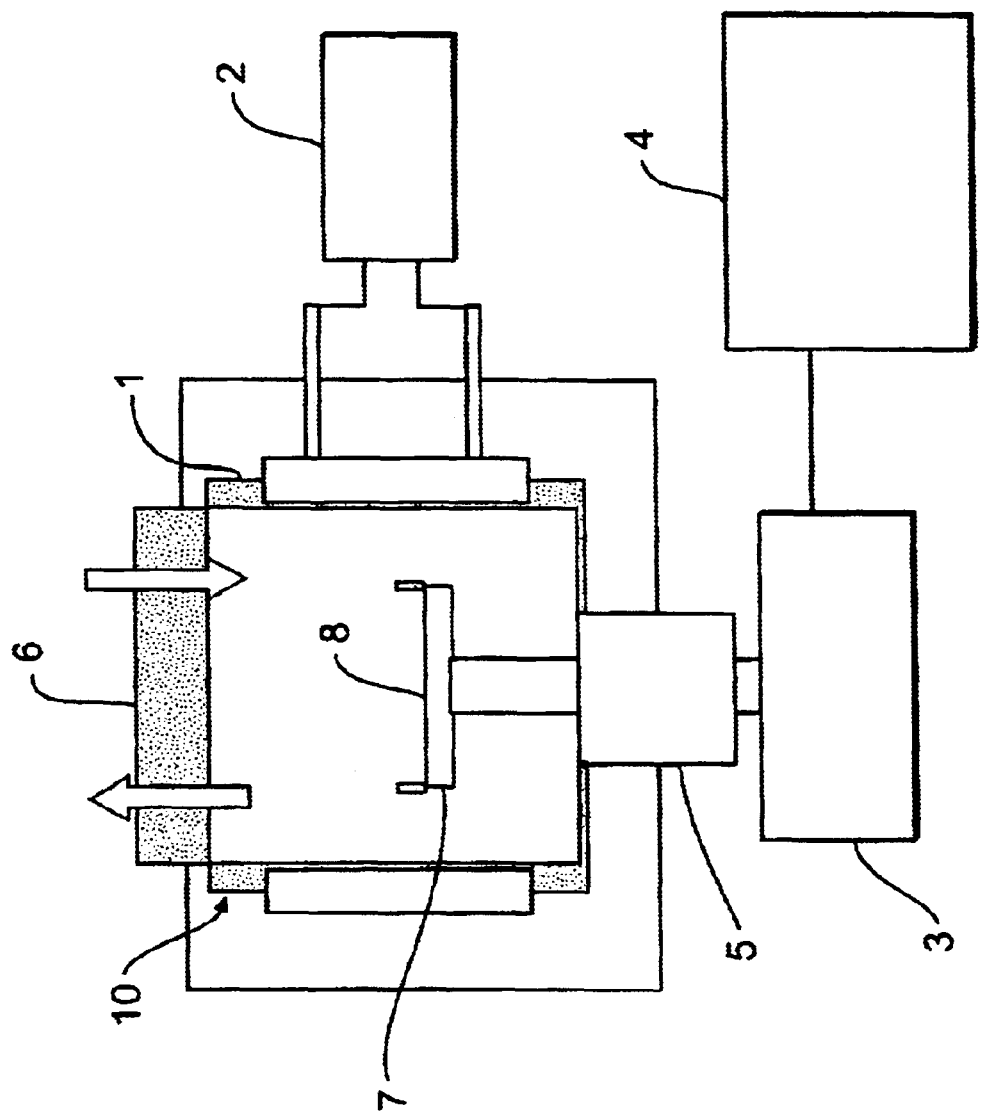
FIG. 1 is a schematic view of the embodiment of the sintering apparatus of the present invention, which uses centrifugal force.

Below the embodiments of the present invention are explained.

This invention contributes to the process of making dense a compact of particulate material for a ceramic or of particles of metal, or a ceramic precursor film. The present invention can be applied to sintering oxides, nitrides, and carbides, as well as a compact or a film of any other ceramic material. It is also applied to material of any metal, regardless of whether it is iron or nonferrous metal.

The subject material for ceramics or the compact of particles of metal in this invention includes a material shaped in a die and then formed by the CIP forming, a sheet of material resulting from tape-casting or screen-printing, and a material made by laminating such sheets. Rotating and heating in a furnace any of those materials secured to a disk that is rotated at a high speed produces a dense sintered compact. In this way, the present invention is technique to produce a dense film or a dense sintered compact by applying stresses resulting from centrifugal force to the material and by heating it. Thus the present invention is not limited by the kind, size, and thickness of the material, the kind of a substrate, etc.

Further, about the subject ceramic precursor film in this invention, the method to produce it is not limited. When the film is produced by the sol-gel method, this method may be any one of the dip coating process wherein a specified substrate is immersed in a produced sol-gel solution, the spin coating process wherein a sol-gel solution is applied to a substrate placed on a rotary disc, etc.

Although the thickness of the ceramic precursor film can be controlled by adjusting the viscosity or the number of coats of the sol solution, preferably it may be within a range from several microns to several tens of microns. After being coated, the substrate is dried at room temperature or a low temperature (equal to or less than 200° C.) and then attached to a disk that is rotated at a high speed in a furnace. Thus by applying a force of 10–700,000 G (a centrifugal force produced by rotating the disk at a high speed) to the substrate while heating it, a dense ceramic film is produced.

The basic principle of the present invention is to produce a dense sintered film or compact by heating a material to be sintered that is placed on the work-holding portion and simultaneously rotating the work-holding portion at a high speed, thereby applying a centrifugal force to the surface of the material. The centrifugal force is preferably 10–700,000 G, and more preferably 1,000–10,000 G. When the diameter of the disc is 8 cm, and the material is placed at the periphery of the disk, and if the disc revolves at 500 rpm, the force to be applied to the material is 22 G, if 1000 rpm, 89 G, if 1500 rpm, 201 G, if 2000 rpm, 357 G, if 3000 rpm, 804 G, if 5000 rpm, 2236 G, if 10000 rpm, 8944 G, if 20000 rpm, 35776 G, and if 50000 rpm, 223600 G.

These forces are greater than a force normally used in sintering by the hot pressing method. Further, it has been also theoretically found that those forces are effective to make dense a compact made of material for ceramics or material of particles of metal. The centrifugal force enhances the preferable compaction of the particles, the elastic deformation of the material by enhancing its diffusion when it is sintered, the viscous flow of the material, and the mechanism for making the material dense such as dissolution/extraction, etc., when a liquid phase exists. Thus the centrifugal force increases the density of the particulate material for a ceramic or of a metal and allows the material to be sintered at a low temperature.

Although the heating temperature is not especially limited in this invention, it is preferably 300–1800° C., and more preferably 500–1500° C. The reason is that if it is less than 500° C. it is difficult to have the material be diffused, and if it is more than 1500° C. it is difficult to achieve the intended effect of the centrifugal force, since the rate of the diffusion rapidly increases.

The apparatus for sintering of the present invention is now explained.

FIG. 1 is a schematic view of an embodiment of the sintering apparatus of the present invention that uses centrifugal force. In FIG. 1 the number 10 denotes a gastight furnace having a heating portion 1 for heating air or gas and material in the furnace and a cover 6 for allowing the access to the inside of the furnace when it is opened and for gastightly closing it. The number 2 denotes a first controller for controlling the temperature of the heating portion 1. The number 7 denotes a work-holding portion of a rotary disc 8, which is mounted inside the furnace 10. The number 5 denotes a vacuum and magnetic shielding bearing that rotatably receives the rotary disc 8 and connects it to rotating means 3, which is disposed outside the furnace 10. The rotating means 3 include a motor (not shown) for rotating the rotary disc 8. The number 4 denotes a second controller for controlling the number of revolutions of the rotating means (motor).

The work-holding portion 7 includes an attachment to which a material to be compacted and sintered is secured. The attachment is configured such that the material is subject to the radial, centrifugal force due to the disc 8 being rotated at high speed.

Since the bearing 5 is one that has a vacuum and magnetic shielding, the material can be sintered in a vacuum or any kind of ambient gas. To resist the high ambient temperature, the disc 8 may be made of a ceramic and may include a ceramic rotary shaft, and the bearing 5 may be a water-cooled vacuum and magnetic shielding bearing. However, they are not limited to that material or system.

The heating portion 1 may be a heating unit made of an electric resistance material, but is not limited to it.

The first controller 2 for controlling the temperature of the heating portion 1 may include, for example, a power-controlling thyristor, which can precisely control the heating, a programmed temperature controller, and a non-contact type infrared thermometer, which can directly measure the temperature of a test piece.

The second controller 4 for controlling the number of revolutions may include, for example, but is not limited to, an inverter-driving driver that changes the frequency when the motor is an induction motor, or a servo-driver when it is a servomotor.

EXAMPLES

Below the examples of the present invention will be explained, but it is not limited to them.

Example 1

Fine particles of alumina (the mean diameter: 0.1 $\mu$m) are formed as pellets to be supplied as a material to be centrifugally sintered. After a compact of the pellets is secured to the work-holding portion 7 of the disc 8, the disc is rotated at the rate of 10,000 rpm, while the compact is being heated to 900° C. at the temperature-increasing rate of 10° C./min. The temperature of 900° C. is maintained for five minutes, and the temperature of the furnace is then lowered. A comparative test was carried out, wherein the same compact was sintered in the furnace under the same heating conditions, and under the condition that the disc 8 was not rotated. The relative density (the apparent density/the theoretical density [3990 Kg/M$^3$]) of the sintered compact that was centrifugally sintered was 95%, while that of the sintered compact that was not centrifugally sintered was 75%. It has been found from these results that applying a centrifugal force to the material while it is heated increases the density of the sintered material.

Example 2

Now, the second example is explained, wherein a substrate that is coated by ultra fine particles is centrifugally sintered. Ultra fine particles of TiO$_2$ (the specific surface area: about 50 m$^2$/g) were put into a solvent (the base of which was polyethylene glycol), and its viscosity was adjusted to make a paste. The resultant paste was put on a screen, and screen-printing was carried out on a substrate of silica glass. After that screen-printing, the substrate was heated at the temperature of 150° C. in a drying oven. To increase the thickness of the coating, the screen-printing and the baking process at the temperature of 150° C. were repeated ten times each. The resultant substrate was attached to the work-holding portion of the centrifugal sintering furnace and was rotated at a rate of 10,000 rpm while being heated to 800° C. at the temperature-increasing rate of 10° C./min. The temperature of 800° C. was maintained for five minutes, and the furnace was then cooled. A comparative test was then carried out, wherein the same substrate was baked in the same centrifugal sintering furnace under the same heating conditions and under the condition that no centrifugal force was applied to the substrate. Although many cracks were visually observed in the resultant sintered TiO$_2$ film that had not been centrifugally sintered, no crack was seen in the resultant sintered TiO$_2$ film that had been centrifugally sintered. It has also been found from these results that applying a centrifugal force to the coating while it is being baked is effective to prevent it from cracking, which might have been caused if it were baked with no centrifugal force being applied to it.

Example 3

This third example is one to show centrifugally sintering a film that is produced by using the sol-gel method (a BaTiO$_3$ film). To produce a BaTiO$_3$ film, first a coating solution was produced. The amounts mixed of the material used to produce it were metallic barium 0.03, titanium isopropoxide 0.03, acetylacetone 7.0×10$^3$, water 0.09, acetic acid 1.21, and isopropyl alcohol 100 (all in mol). Mixing was carried out in a glove box after it was evacuated, while dried nitrogen was being blown into it. Isopropyl alcohol was put in a flask, and a piece of the metallic barium was then put in the flask. The flask was then heated to produce an isopropyl alcohol solution of barium isopropoxide. First a titanium isopropoxide solution was added, and secondarily the acetylacetone was added to the isopropyl alcohol solution, and they were mixed in a glove box for three hours at a temperature of 80° C. After mixing, an isopropyl alcohol solution of the acetic acid and the water was dropped in it. Thus the coating solution was produced. A silicon substrate was immersed in the produced coating solution and was then raised at the rate of 0.1 mm/s. The substrate was then dried at a temperature of 100° C. The substrate was subject to that coating process five times and the drying process (i.e., heating process) five times. The resultant substrate was provided as material to be centrifugally sintered. After the substrate that had been coated with a film was attached to the work-holding portion of the centrifugal sintering furnace, it was rotated at the rate of 10,000 rpm while being heated to 600° C. at a temperature-increasing rate of 10° C./min. The temperature of 600° C. was maintained for five minutes. A comparative test was then carried out, wherein the same substrate, which had been coated with the film, was sintered in the furnace under the same heating conditions and under the condition that no centrifugal force was applied to the substrate. The crystal phase of each of the resultant films of the two sintered substrates was examined by using X-ray analysis. A clear peak of a BaTiO$_3$ crystal was seen in the film that had been centrifugally sintered, but the film that had been sintered without applying a centrifugal force to it was configured with an amorphous phase. It has also been found from these results that applying a centrifugal force to a ceramic precursor film that has been produced by using the sol-gel method, while it is being sintered, is effective to prevent it from cracking and peeling, and to crystallize it.

It should be understood that the embodiments described above are exemplary only, and many variations can be made to them. Thus the present invention includes such variations, and the scope of the invention is defined by the attached claims.

We claim:

1. A method of sintering one of a compact of particulate material for a ceramic, a compact of particles of a metal, or a ceramic precursor film, comprising sintering by heating and baking one of a compact of particulate material for a ceramic, a compact of particles of a metal, or a ceramic precursor film while applying centrifugal force to said one of the compact of particulate material for a ceramic, the compact of particles of a metal, or the ceramic precursor film.

2. The method of claim 1, wherein the centrifugal force to be applied is 10–700,000 G.

3. The method of claim 1 or 2, wherein the heating and baking is performed at an ambient temperature of 300–1800° C.

4. The method of claim 1, wherein the heating and baking is performed in one of a vacuum or an arbitrary ambient gas.

5. The method of claim 2, wherein the heating and baking is performed in one of a vacuum or an arbitrary ambient gas.

6. The method of claim 3, wherein the heating and baking is performed in one of a vacuum or an arbitrary ambient gas.

7. An apparatus for sintering, comprising: a furnace; a work-holding portion rotatably mounted in the furnace for holding material to be sintered; and rotating means connected to the work-holding portion for rotating the work-holding portion so as to apply centrifugal force to the material held by the work-holding portion.

8. The apparatus of claim 7, further comprising a first controller for controlling a temperature of the furnace and a second controller for controlling the number of revolutions of the rotating means.

9. The apparatus of claim 7, wherein the furnace is gastight and has a cover for providing access to an inside of the furnace and for gastightly closing the furnace.

10. The apparatus of claim 7, wherein the rotating means is disposed outside the furnace, and the work-holding portion is rotatably connected to the rotating means through a vacuum and magnetic shielding bearing.

11. The apparatus of claim 10, wherein the furnace is gastight and has a cover for providing access to an inside of the furnace and for gastightly closing the furnace.

12. The method of claim 1, including coating a substrate with a material of one of the compact of particulate material of a ceramic, the compact of particles of a metal, or the ceramic precursor film to provide a coated substrate and then heating and baking the coated substrate while applying the centrifugal force to the coated substrate.

* * * * *